United States Patent
Renfro et al.

[11] Patent Number: 4,917,567
[45] Date of Patent: Apr. 17, 1990

[54] LOG YARDER

[76] Inventors: Gerald E. Renfro, 10735 Horseshoe Bend Rd., Boise, Id. 83703; Kenneth W. Renfro, Third St. Cir., Horseshoe Bend, Id. 83629

[21] Appl. No.: 257,884

[22] Filed: Oct. 14, 1988

[51] Int. Cl.$^4$ .............................................. B66C 1/44
[52] U.S. Cl. .................................... 414/731; 212/167; 294/86.4; 294/112
[58] Field of Search ...................... 414/729, 731, 739; 294/86.4, 112; 212/76, 167

[56] References Cited

U.S. PATENT DOCUMENTS

| | | | |
|---|---|---|---|
| 2,710,167 | 6/1955 | Sandland | 254/327 |
| 2,745,559 | 5/1956 | McIntyre | 212/167 X |
| 3,036,718 | 5/1962 | Koivula | 212/168 |
| 3,268,090 | 8/1966 | Wirkkala | 254/323 |
| 3,630,399 | 12/1971 | Hanitz | 414/731 |
| 3,658,191 | 4/1972 | Murphy | 212/167 X |
| 3,709,390 | 1/1973 | Tanguay | 414/731 |
| 4,315,652 | 2/1982 | Barwise | 414/739 X |

FOREIGN PATENT DOCUMENTS 2823429 12/1979 Fed. Rep. of Germany ...... 414/729

Primary Examiner—Robert J. Spar
Assistant Examiner—Donald W. Underwood
Attorney, Agent, or Firm—Paul F. Horton

[57] ABSTRACT

A log yarder including a support vehicle; a horizontally rotatable framework mounted on the vehicle; one or more booms mounted on the framework; an elongated heeling rack mounted on the most terminal boom; a slack kicker for skidding logs to the yarder; and a grapple for loading or placement of the logs so skidded. The combination of slack kicker and grapple enables a single operator to skid a fallen log to the grapple for loading the log for hauling or for deck placement. The slack kicker includes a cable which is threaded through one end of the heeling rack which may be used to skid the logs into a substantially aligned position with the grapple for convenient and efficient loading.

6 Claims, 2 Drawing Sheets

LOG YARDER

BACKGROUND OF THE INVENTION

1. Field of the Invention

This invention relates generally to log yarders and, more particularly to yarders and loaders.

2. Description of the Prior Art

In current logging procedures, logs are gathered to a common point from the surrounding area where the trees have been felled by means of log yarders having what is known in the art as slack kickers as typified by U.S. Pat. No. 2,710,167 issued to M. E. Sandland; U.S. Pat. No. 3,268,090 issued to A. R. Wirkkala; and U.S. Pat. No. 3,036,718 issued to E. C. Koivula. The slack kicker throws a cable, with tongs, to a remote area which may be two hundred or more feet from the yarder. The tongs are then attached to the log and the log skidded to a place adjacent the yarder. At this point, the yarder's job is completed and a loader is then brought to the site for loading logs for transportation or for stacking. Present procedure for large logs and with the equipment now available requires two separate machines, requires an operator for both the yarder and loader; requires multiple handling of the same log; and is therefore time consuming and cost inefficient.

SUMMARY OF THE INVENTION

The present invention overcomes these problems by providing a single machine which is itself capable of moving from one site to another and which has both a slack kicker and a grapple for both skidding and loading logs. In a novel arrangement, the cable of the slack kicker is threaded through one end of an elongated heeling rack midway between log engaging prongs of the rack and a hydraulic powered grapple is attached to the opposing end of the rack. Alignment between the log engaging prongs of the heeling rack and the jaws of the grapple, in conjunction with the cable placement, results in skidded logs being in substantial alignment for quick and convenient loading or placement.

It is therefore a primary object of the present invention to provide a log yarder having both a slack kicker and a grapple so that logs may be skidded and loaded with a single machine and with a single operator.

It is also a primary object of the present invention to provide a log yarder capable of immediately loading skidded logs.

It is also an object of the present invention to provide a log yarder having a slack kicker and a grapple and further having a heeling rack through which the cable of the slack kicker is threaded so that a skidded log may be brought adjacent the grapple.

More particularly, it is an object of the present invention to provide a log yarder having a slack kicker threaded between the prongs of a heeling rack and a grapple in alignment with the prongs so that a skidded log is brought into substantial alignment with the grapple for loading.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
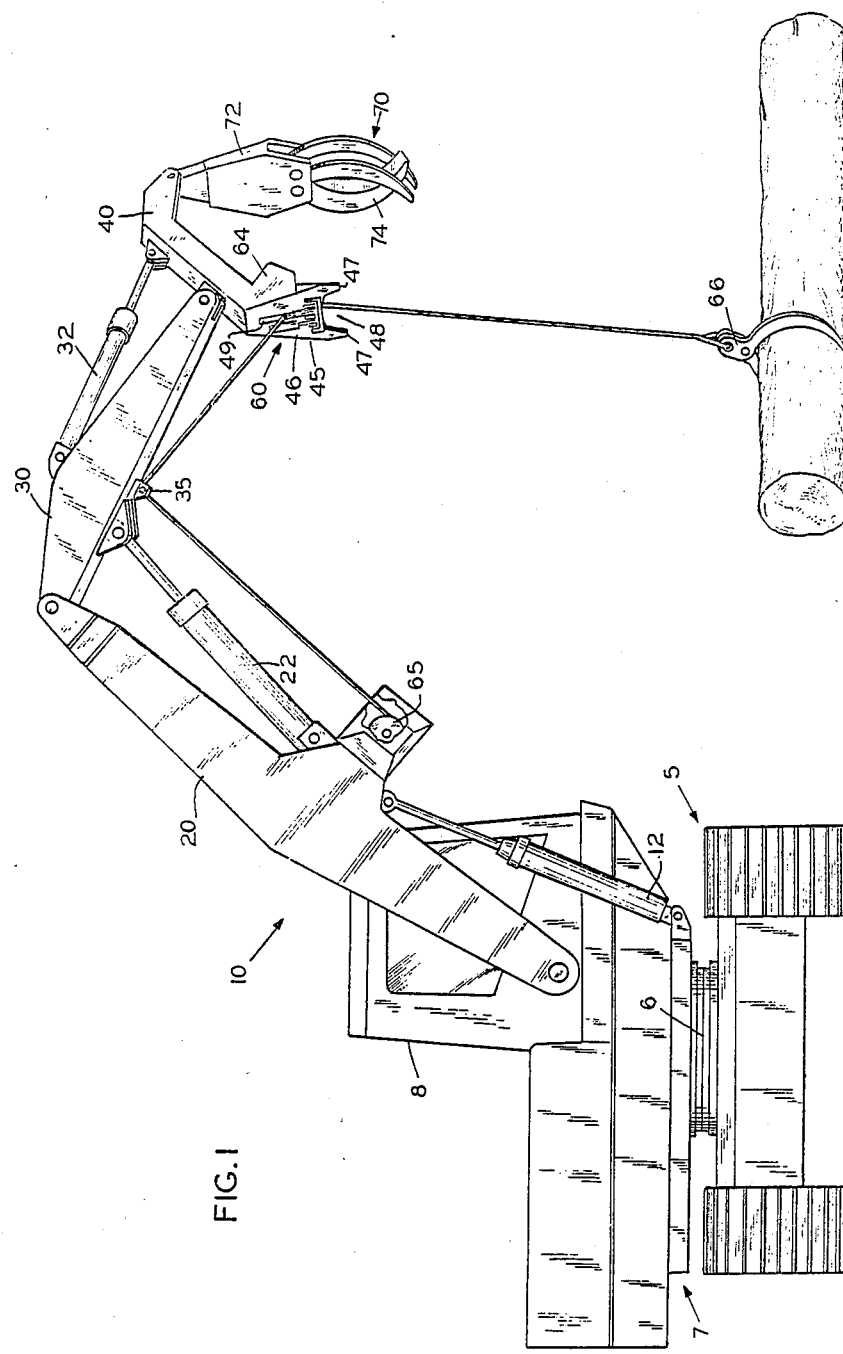
FIG. 1 is a side view of the yarder of the present invention.

Referring now to the drawings, and, more particularly to FIG. 1, an embodiment to be preferred of a log yarder 10, made according to the present invention is disclosed. Yarder 10 includes, generally, a support vehicle 5; a turntable 6 mounted for horizontal rotation on the vehicle; a framework 7 mounted on the turntable, the framework carrying a cab 8; a main boom 20 pivotally mounted for vertical movement on the framework; a stick boom 30 also pivotally mounted for vertical movement on the main boom; a heeling rack 40 pivotally mounted for vertical movement on the stick boom; a slack kicker, designated generally by the numeral 60; and grapple means designated generally by the numeral 70 pivotally mounted on the heeling rack. Yarder 10 utilizes a series of hydraulic piston-cylinder units 12, 22, and 32 for pivoting booms 20, 30, and heeling rack 40, respectively. An engine mounted on the framework and not shown provides power for transportation, the hydraulic units, and all accessories.

Figure 4:
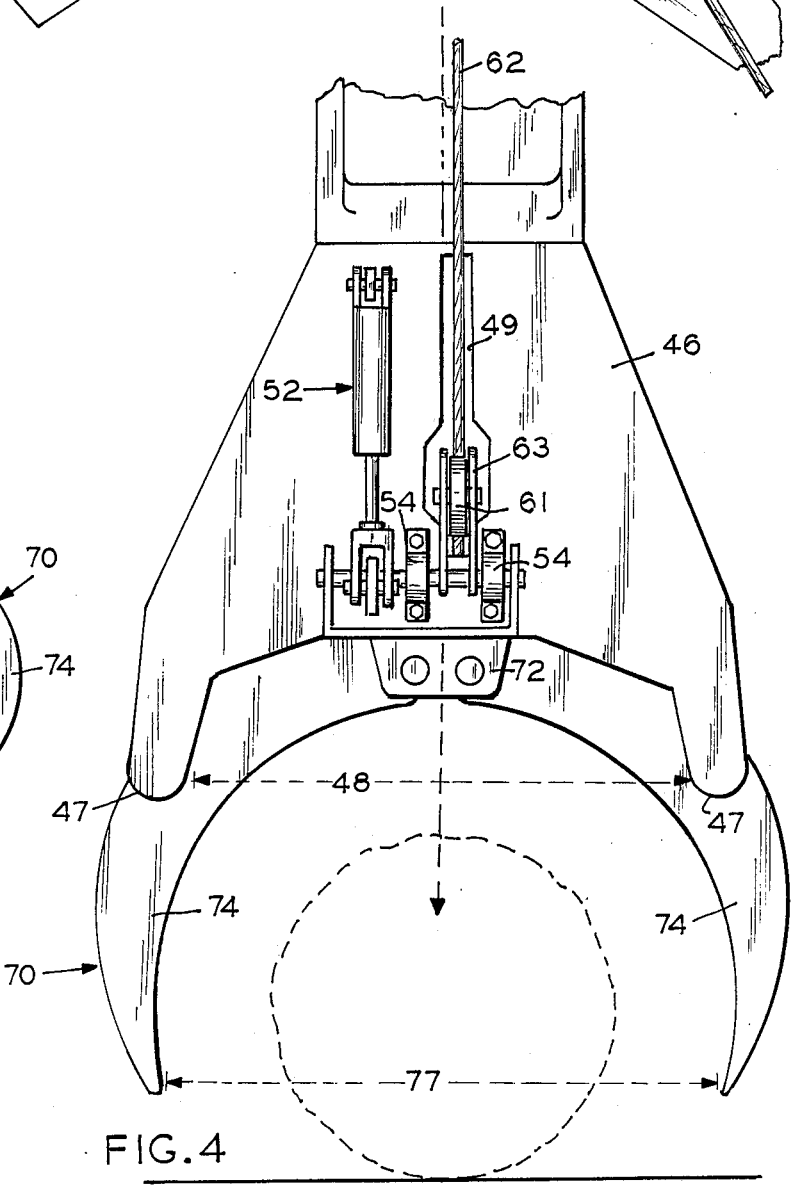
FIG. 4 is a perspective view of the back face of the section of the heeling rack shown in FIG. 2 showing the entrance of the slack kicker cable into the rack.

Heeling rack 40 is an elongated structure defining heeling member 45 on one end and carrying grapple 70 on the opposing end. Heeling member 45, shown to advantage in FIGS. 2 and 4, includes a plate 46, substantially triangular in shape and a slack kicker housing 64 mounted on the front face of the plate. Plate 46 is provided with a pair of laterally spaced and downwardly depending prongs 47, defining a gap 48 therebetween, said prongs operable to engage and partially encircle a log. Plate 46 defines an elongated slot 49 located a the substantial midpoint of the plate and equidistantly spaced from prongs 47. Slot 49 opens into housing 64 for the threading of cable 62, of slack kicker 60, therethrough, as will hereinafter be more fully explained. On the rear surface of plate 46 is mounted a hydraulic piston-cylinder unit 52 which is operable to rotate a cam 63 which rides on bearings 54 to which a compression sheave 61 is affixed by means of sheave support brackets 69. Compression sheave 61 compresses cable 62 against another, motor driven, compression sheave, not shown, but located within housing 64, causing the cable to be payed out at a preselected rate when piston cylinder unit 52 is activated to compress the cable. Cable 62 exits the housing through an aperture 67 and through a pair of spaced rollers 68.

Figure 2:
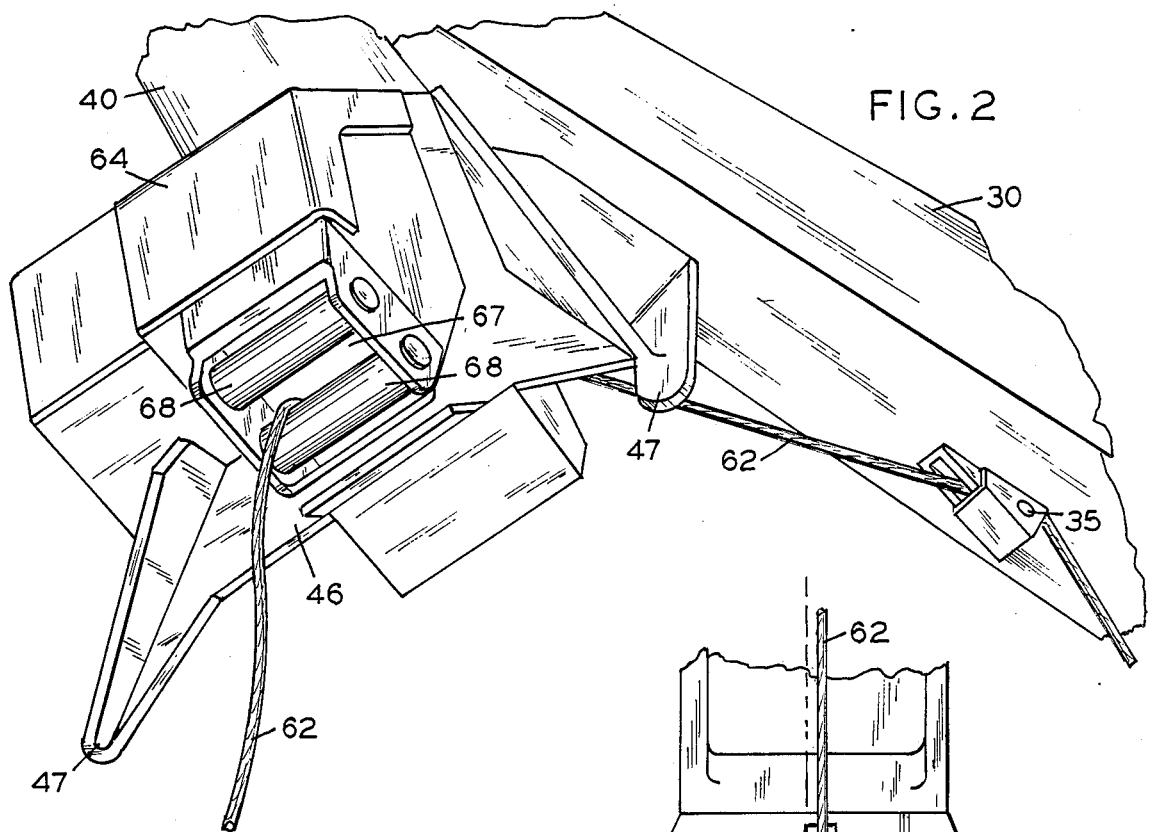
FIG. 2 is a perspective view of the front face of one section of the heeling rack of the present invention showing the cable as emerging from the rack midway between the prongs.

Referring to FIGS. 1 and 2, it will be seen that slack kicker cable 62 is connected at one end to a motor driven winch 65 located on main boom 20; is then threaded through a support sheave 35 located on stick boom 30; enters heeling member 45 through elongated slot 49 where it engages the compression sheaves; exits the housing 64 through aperture 67, between rollers 68, and terminates in its connection with tongs 66.

Figure 3:
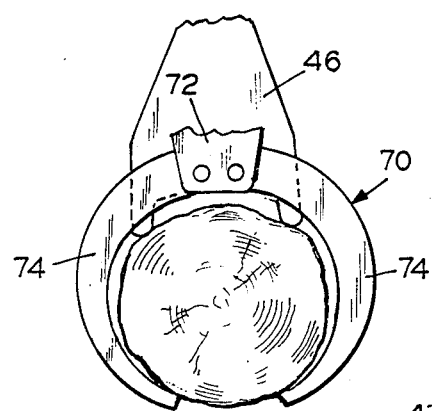
FIG. 3 is a schematic end view of a log as being engaged by the grapple and the prongs of the heeling rack showing alignment of the grapple with the prongs.

As shown in FIG. 1, grapple 70 is pivotally affixed to heeling rack 40 on the opposing end from heeling member 45. A piston-cylinder unit contained within grapple housing 72 serves to open and close jaws 74 of the grapple. Jaws 74 are substantially parallel with prongs 47 of heeling member 45 and define an opening or gap 77, which, when in the open position, is in alignment with gap 48 defined by the prongs, as shown in FIG. 3 and by the dotted arrow in FIG. 4. It is to be noted that in that cable 62 of slack kicker 60 is threaded through the heeling member at the approximate midpoint of the prongs that a log skidded by the slack kicker is most often in alignment with the openings defined by the jaws of the grapple and the prongs of the heeling member for grasping by the jaws and by contact by the prongs which partially encircle the log, designated by the numeral 3.

In operation, the operator of yarder 10 first throws the tongs 66 of slack kicker 60 to a point adjacent the felled tree by horizontally rotating framework 7, with attached booms, on turntable 6, while simultaneously paying cable 62 out by activation of winch 65 and compression sheaves 61. Tongs 66 are then affixed to the log and the log skidded to a position within reach of the grapple, as shown in FIG. 1. In skidding, the yarder is rotated upon the turntable to face the log, with the booms in alignment with the direction of pull. Cable 62, in exiting the heeling member 45 at the midpoint of prongs 47, causes the log to be in substantial alignment with the openings defined by the jaws of the grapple and the prongs of the heeling member for loading. Once in position beneath the grapple, the grapple is activated to open the jaws and then closed to grasp the log. The grapple may then be pivoted for further alignment of the log relative to the heeling rack. The log is prevented from swinging by its contact with the prongs of the heeling rack. The booms are then activated to lift the log and the framework rotated for placement of the log on a truck for hauling or for placement upon a deck.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A log yarder comprising:
    a support vehicle;
    a framework mounted for horizontal rotation upon said support vehicle;
    boom means pivotally engaging said framework for vertical movement relative thereto;
    an elongated heeling rack pivotally mounted upon said boom means;
    a slack kicker secured to said yarder, said kicker including a cable threaded through said heeling rack for attachment to a log; and
    grapple means pivotally secured to said heeling rack; said slack kicker operable to skid logs to said heeling rack and said grapple means operable to grasp the logs for loading and placement.

2. The log yarder as described in claim 1 wherein said heeling rack includes a pair of downwardly depending and laterally spaced prongs, defining a gap therebetween, for partially encircling a log and wherein said cable is strung through said heeling rack substantially midway between said prongs so that a log may be skidded in substantial alignment with the gap defined by the prongs.

3. The log yarder as described in claim 2 wherein said grapple means includes a pair of log grasping jaws, said jaws defining a gap therebetween when in the open position, the gap defined by said jaws being in alignment with the gap defined by said prongs.

4. A log yarder comprising:
    a support vehicle;
    a framework mounted for horizontal rotation upon said support vehicle;
    a main boom pivotally mounted for vertical movement upon said framework;
    a stick boom pivotally mounted for vertical movement upon said main boom;
    an elongated heeling rack pivotally mounted upon said stick boom;
    a slack kicker secured to said yarder, said kicker including a power driven winch; a cable; and tongs, for attachment to a log, affixed to the free end of said cable; said cable threaded through said heeling rack adjacent one end thereof; and
    grapple means pivotally secured to said heeling rack adjacent the opposing end thereof; said slack kicker operable to skid logs to said heeling rack and said grapple means operable to grasp the logs for loading and placement.

5. The log yarder as described in claim 4 wherein said heeling rack includes a pair of downwardly depending and laterally spaced prongs, defining a gap therebetween, for partially encircling a log and wherein said cable is strung through said heeling rack substantially midway between said prongs so that a log may be skidded in substantial alignment with the gap defined by the prongs.

6. The log yarder as described in claim 5 wherein said grapple means includes a pair of log grasping jaws, said jaws defining a gap between when in the open position, the gap defined by said jaws being in alignment with the gap defined by said prongs.

* * * * *